Oct. 27, 1925.
J. N. MOORE
1,559,346
DISHWASHING MACHINE
Filed Sept. 22, 1924   3 Sheets-Sheet 1
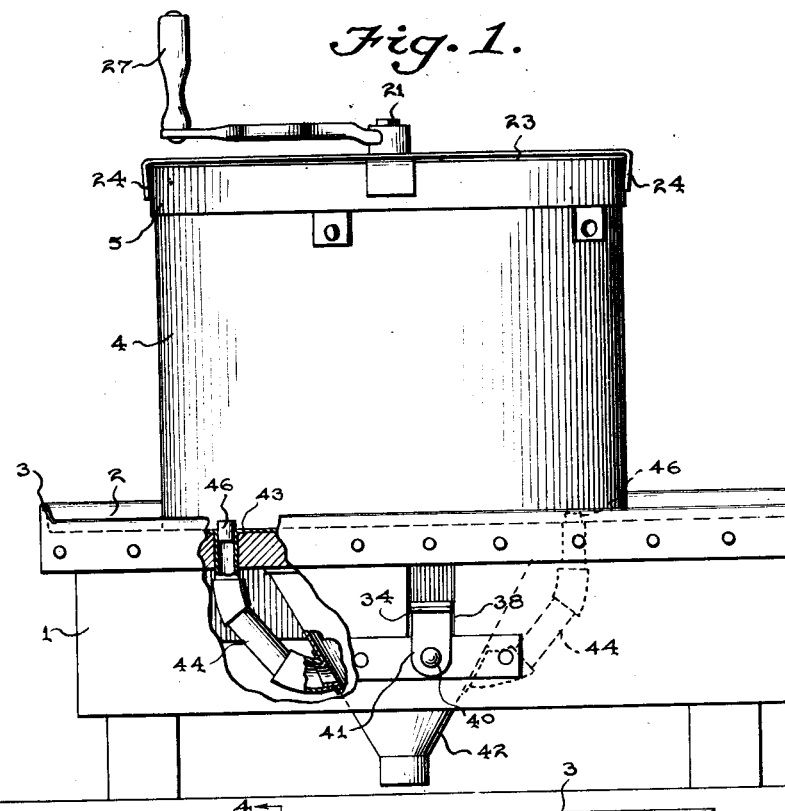
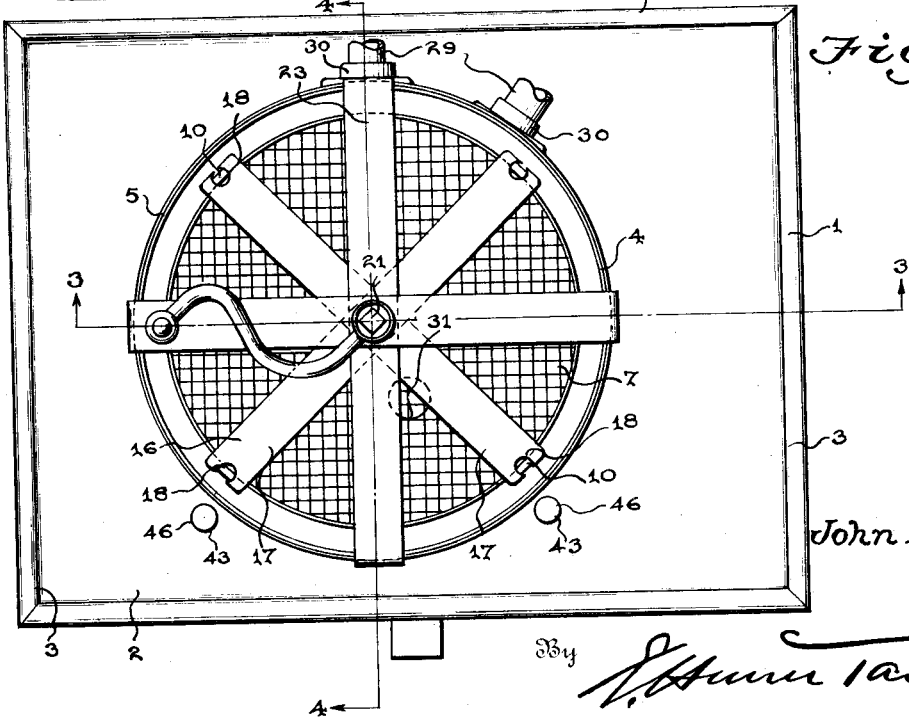
Inventor
John N. Moore Oct. 27, 1925.
J. N. MOORE
1,559,346
DISHWASHING MACHINE
Filed Sept. 22, 1924     3 Sheets-Sheet 2
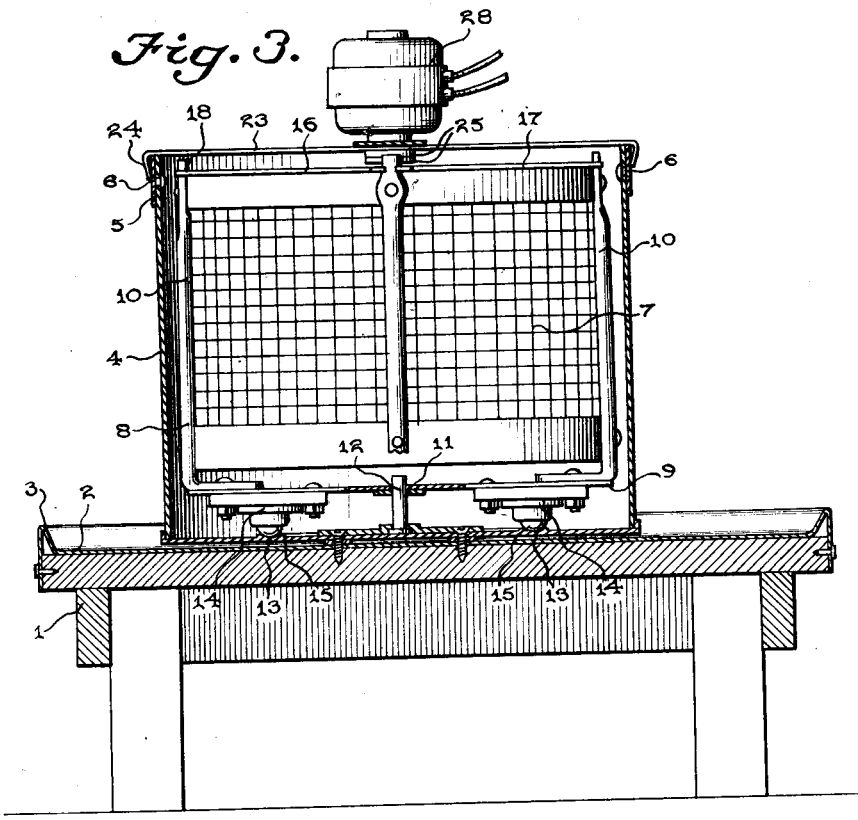
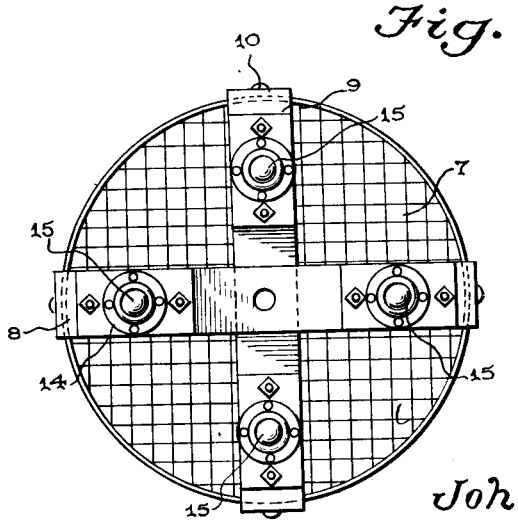
Inventor
John N. Moore

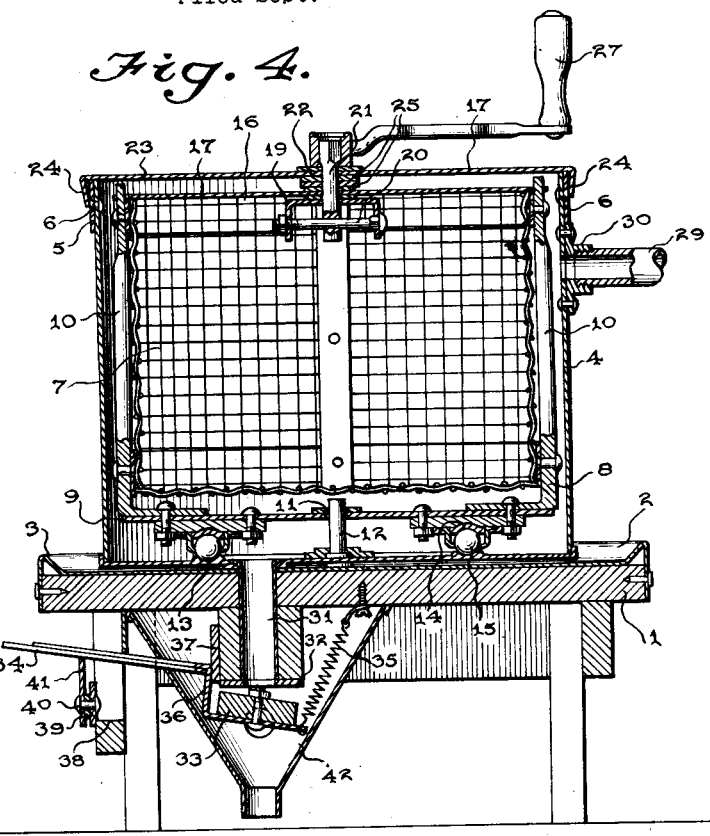
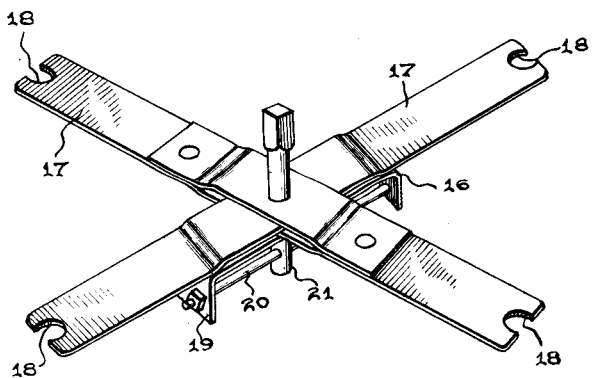

Patented Oct. 27, 1925.

1,559,346

UNITED STATES PATENT OFFICE.

JOHN N. MOORE, OF THORNDALE, TEXAS.

DISHWASHING MACHINE.

Application filed September 22, 1924. Serial No. 739,132.

*To all whom it may concern:*

Be it known that JOHN N. MOORE, a citizen of the United States of America, residing at Thorndale, in the county of Milan and State of Texas, has invented new and useful Improvements in Dishwashing Machines, of which the following is a specification.

It is a purpose of the present invention to provide, in a dish washing machine, a supporting table including a drain pan fastened thereto with a marginal uprising flange and in the center of which pan the dish washing machine is fixed, so that the dish receiving cage or basket may be removed from the machine and placed upon the drain pan while the dishes are draining, there being a funnel or similar outlet for the water in the dish washing machine and to drain off the water from the drain pan.

Another purpose is to provide a discharge funnel performing the double function of carrying off the dirty water from the machine as well as the water which drains off the dishes into the drain pan, there being a suitable tensioned valve located within the funnel for controlling the discharge of water from the dish receiving receptacle.

Still another purpose is to provide a machine of this character wherein means is afforded for removably and operatively supporting the revoluble dish receiving cage or basket, in conjunction with a spider removably supported on the marginal edge of the receptacle which receives the cage or basket, thereby not only providing a bearing for the pintle of the cage or basket (the bottom of which has a pintle mounted in a bearing in the bottom of the receptacle) but also providing a support for a motor which may be substituted in lieu of a crank or other hand operated means.

A further purpose is to provide, in a dish washing machine, means of connection at a suitable point in the wall of the receptacle for attaching hot and cold water pipes or hose sections for permitting the flow of hot and cold water into the receptacle for the purpose of washing the dishes when the basket is rotated.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in elevation of the improved dish washing machine constructed in accordance with the invention.

Figure 2 is a plan view of the same.

Figure 3 is a vertical sectional view on line 3—3 of Figure 2 taken longitudinally through the machine with a motor attached.

Figure 4 is a vertical sectional view on line 4—4 of Figure 2 taken transversely of the machine, thereby not only more clearly showing the valve at the bottom of the receptacle but also illustrating the pipe connections between the drain pipe and the outlet funnel.

Figure 5 is a detail view of the cage or basket.

Figure 6 is a detail perspective view of the spider which carries the top shaft for the cage or basket.

Referring to the drawings, 1 designates a suitable table which may be any size and height, and fastened to the top of the table is a drain pan 2, the sheet metal of which is fastened to the edge of the table top. This drain pan has an upstanding marginal flange 3 acting to retain the water in the pan. Mounted on the drain pan centrally thereof and secured thereto, as shown, is a receptacle 4 which may be any height and diameter and preferably cylindrical. The upper margin of the receptacle 4 is reinforced by a metal band 5 which is riveted or otherwise secured at 6 to the wall of the receptacle.

The receptacle 4 receives a wire fabric cage or basket 7 which has a reinforcing band at its upper edge. This cage or basket is cylindrical and of a diameter smaller than the diameter of the receptacle but conforming thereto and capable of revoluble movements. The cage or basket includes a frame 8 which consists of a spider 9 at its lower portion upon the terminal portions of the arms of which upstanding rods 10 are connected and secured. These rods are fastened in any suitable manner to the reinforcing band at the top of the cage or basket. The rods 10 project a slight distance above the marginal band at the top of the cage or basket.

The spider 9 has a central opening 11 for the reception of a central stud 12 which rises from the bottom of the receptacle, there being raceways 13 and 14 in the bottom of the receptacle and on the under face of the spider 9 for the purpose of receiving ball bearings or the like 15 to insure that the spider, together with the cage or basket, will freely revolve.

A second spider 16 consists of intersecting bars 17 which have terminal openings 18 for the reception of the projecting ends of the rods which extend from the ends of the arms of the bottom spider for the purpose of imparting revoluble movements to the cage or basket. This construction permits the cage or basket to be revolubly operated. Depending from the spider 16 is a U-shaped bracket 19 through which a transverse rod 20 passes and is fixed in the depending parts of the bracket. This rod is suitably headed so as to prevent longitudinal movement thereof.

A shaft 21 extends centrally through the spider 16 and has an opening in its lower end to receive the rod, so that the cage or basket may rotate with the vertical shaft. The shaft 21 has a bearing 22 in a third spider 23, the arms of which are provided with terminal bent extremities 24 which engage down over and adjacent the exterior surface of the reinforcing band at the top of the receptacle, the third spider acting to maintain the frame of the cage or basket concentric with the receptacle, especially during its rotation, so as to prevent the cage or basket from contacting with the inner surface of the receptacle. Suitable washers 25 are interposed between the spiders 16 and 23, thereby spacing them to reduce the friction between the two spiders, hence permitting the cage or basket to revolve freely.

In order to operate the dish washing machine, a suitable handle 27 is detachably connected to the upper end of the shaft for imparting movement to the basket. Obviously, the handle may be removed and an electric motor 28 substituted in lieu thereof. When the motor is used, it may be supported upon the spider which is mounted upon and carried by the receptacle. The shaft of the motor may be connected directly with the shaft which is carried by the spider 16 for the purpose of imparting movement to the cage or basket.

In order to wash dishes, the spider which is supported on the receptacle as well as the spider supported on the basket may be removed, the dishes placed in the basket or cage, and then the spiders reattached. Hot and cold water may be allowed to enter the receptacle through the medium of the hose or pipes 29 which communicate with the interior of the receptacle and are coupled to the wall thereof, as shown at 30. After the required amount of water is allowed to enter the receptacle, a piece of soap or soap shavings having been placed in the cage or basket, the latter may be rotated. The action of the dishes passing through the scalding hot water which may be contained in the receptacle removes the dirt and grease from the dishes. After washing the dishes, the top spider may be detached, the crank having been first removed, then the cage or basket may be removed from the receptacle and placed in the drain pan where the dishes are allowed to drain. The motor may be detached from the shaft in a similar manner.

Depending from the receptacle and passing through the top of the table is an outlet pipe 31 which has a gasket covered valve seat 32 with which the valve 33 cooperates to prevent the escape of water when washing dishes. A lever 34 carries the valve 33 and is under tension of a spring 35. The lever 34 has a bent portion 36 which abuts a fiber abutment 37 which is secured to the outlet pipe. The construction and arrangement of the bend in the lever are such as to permit the corner of the bend to fulcrum on the abutment, especially when the lever is operated against the action of the coil spring, one end of which is attached to the lever and its other end to the under face of the table. The spring is of sufficient tension to hold the corner of the bend against the abutment and the arm of the lever in the bottom of a slot 38 in the side of the table and yet at the same time retain the valve in a closed position against the gasket covered valve seat.

The bottom of the slot in the side of the table has a wear plate 39 with which the arm of the lever engages. Pivoted on the wear plate, as at 40, is a latch 41 which, when the lever is depressed upwardly for the purpose of opening the valve, may engage under the arm of the lever to hold it in such position for the purpose of allowing the water in the receptacle to run off. This outlet or pipe depends from the receptacle and is housed in a funnel emptying pipe 42 which is secured to the under face of the table top.

The drain pan has drain openings or apertures 43, preferably two in number, and connected to the drain pan over the openings are pipes 44 which, in turn, are secured to and communicate with the funnel. These outlet openings or apertures receive suitable stoppers 46, the removal of which will permit the water draining from the dishes when the basket is placed in the drain pan to pass out through the pipes and into the funnel and thereby discharge with the dirty water which passes off from the receptacle. The valve may be opened at the same time the water in the drain pan is draining off so that these actions may be accomplished simultaneously. However, the valve may be opened and the stoppers allowed to remain in the openings, so that the receptacle may be emptied individually.

In washing dishes, the spiders at the top of the receptacle may be removed, the basket detached, the dishes placed therein and the basket returned in mounted position in the receptacle. The spiders may then be replaced and water allowed to enter the receptacle, subsequently to which revoluble movement may be imparted to the basket through the medium of the crank or a motor. After washing the dishes, the spiders may again be removed and the basket placed on the drain pan where the water drained off of the dishes through the stopper-closed openings, by first removing the stoppers, is allowed to enter the funnel which also carries off the refuse water from the receptacle.

The invention having been set forth, what is claimed is:

In a dish washing apparatus, the combination with a stand and a casing supported thereon, of a frame rotatably supported within the casing and having upstanding arms, a basket fitted within the frame and secured to the arms, cross bars with notches in their extremities detachably receiving the upper terminals of the frame arms, a U-shaped bracket depending from said cross bars connected to the frame arms, cross bars on the casing with their extremities detachably engaging with the margin of the casing, a shaft passing through the bars on the basket and having its lower end fixedly connected with depending terminals of the bracket, said shaft rotatably passing through the bars on the casing, and means connected to the upper end of the shaft for rotating the same, thereby rotating the frame and basket as one body.

In testimony whereof he affixes his signature.

JOHN N. MOORE.